United States Patent [19]
Force et al.

[11] Patent Number: 4,714,229
[45] Date of Patent: Dec. 22, 1987

[54] ANTI-VIBRATORY SUPPORT DEVICE FOR A PIPE WHOSE THICKNESS IS SMALL RELATIVE TO THE DIAMETER

[75] Inventors: Christian Force, St. Cheron; Alain Lescure, Chaville, both of France

[73] Assignee: Novatome, Le Plessis-Robinson, France

[21] Appl. No.: 727,645

[22] Filed: Apr. 26, 1985

[30] Foreign Application Priority Data

Apr. 27, 1984 [FR] France ............................... 84 06642

[51] Int. Cl.⁴ ............................................. F16L 3/10
[52] U.S. Cl. ...................................... 248/610; 248/62; 248/74.2; 248/74.4; 24/285; 24/279; 24/19; 138/107
[58] Field of Search ................... 248/560, 610, 58, 62, 248/74.1, 74.4, 74.5, 67.5, 316.1, 316.6; 24/285, 279, 282, 19, 284; 285/61, 64, 411, 373; 138/106, 107

[56] References Cited

U.S. PATENT DOCUMENTS

| | | | |
|---|---|---|---|
| 2,069,552 | 2/1937 | Mikulasek | 24/285 |
| 2,872,141 | 2/1959 | Hefner | 248/62 |
| 3,061,253 | 10/1962 | Keaton | 248/74.1 |
| 3,270,992 | 9/1966 | Cassel | 248/610 |
| 3,423,111 | 1/1969 | Elsner | 285/373 |
| 3,527,484 | 9/1970 | Walkden | 285/373 |
| 3,606,218 | 9/1971 | Enlund . | |
| 3,684,223 | 8/1972 | Logsdon | 248/74.3 |
| 3,913,187 | 10/1975 | Okuda | 248/74.3 |
| 4,530,478 | 7/1985 | McClellan | 138/106 |
| 4,568,115 | 2/1986 | Zimmerly | 24/285 |

FOREIGN PATENT DOCUMENTS

| | | | |
|---|---|---|---|
| 457644 | 3/1928 | Fed. Rep. of Germany . | |
| 1403430 | 5/1965 | France | 24/285 |
| 2339800 | 8/1977 | France . | |
| 2395418 | 2/1979 | France | 248/74.1 |
| 2514293 | 4/1983 | France . | |
| 1149757 | 4/1969 | United Kingdom . | |

Primary Examiner—J. Franklin Foss
Assistant Examiner—Robert A. Olson
Attorney, Agent, or Firm—Pollock, Vande Sande & Priddy

[57] ABSTRACT

Anti-vibratory support device for a pipe whose thickness is small relative to its diameter, comprising a collar (2) formed by at least two rigid annular sectors (2a, 2b, 2c) which are articulated at at least one of their ends to the succeeding sector, to pivot about an axis parallel to the axis of the pipe (1). At least two successive sectors (2b, 2c) are interconnected by an elastic junction means (10, 11, 12) which enables the collar (2) to be closed. Parallelepipedic pads (18) made from knitted stainless steel wire disposed in cases (15) are interposed and put under compression between the collar (2) and the pipe (1). The invention is in particular applicable to pipes conveying liquid sodium of the secondary circuit of fast neutron nuclear reactors.

7 Claims, 7 Drawing Figures

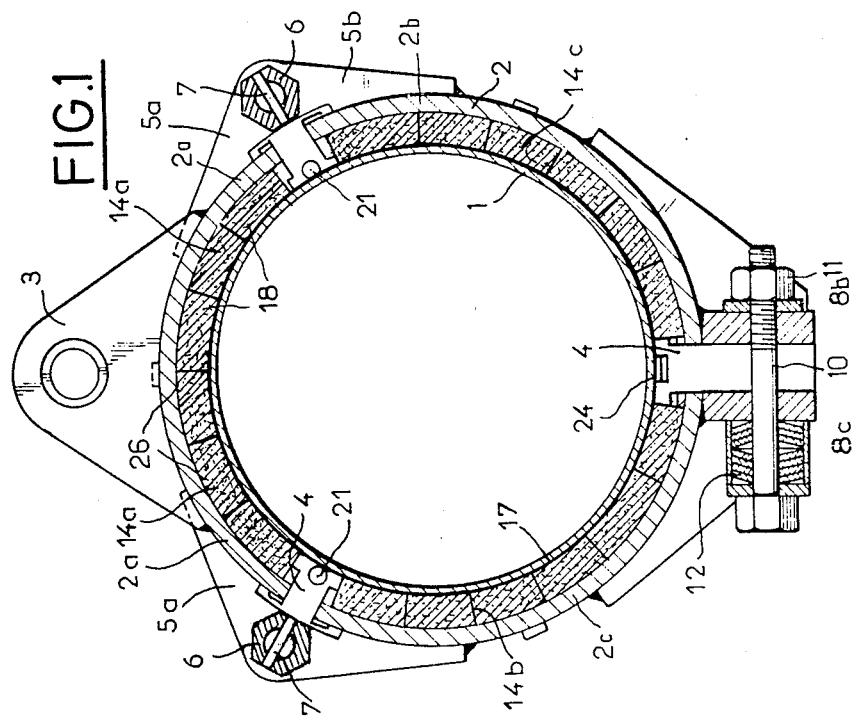
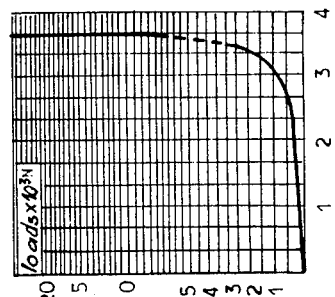
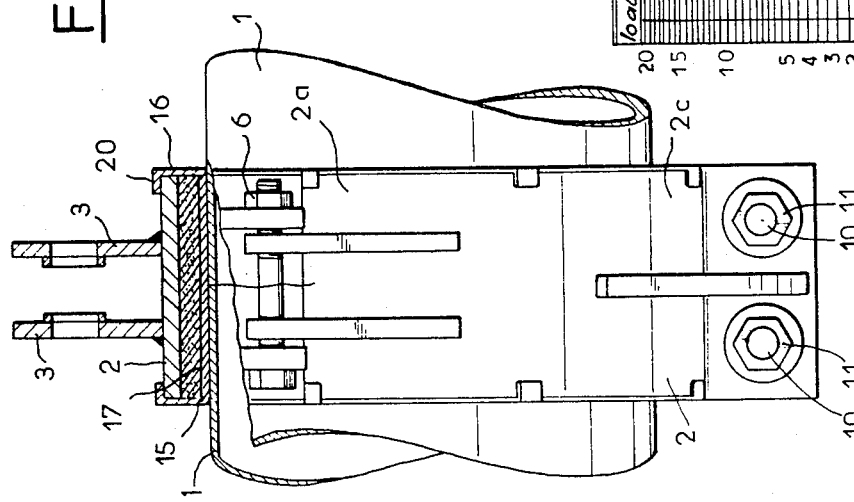

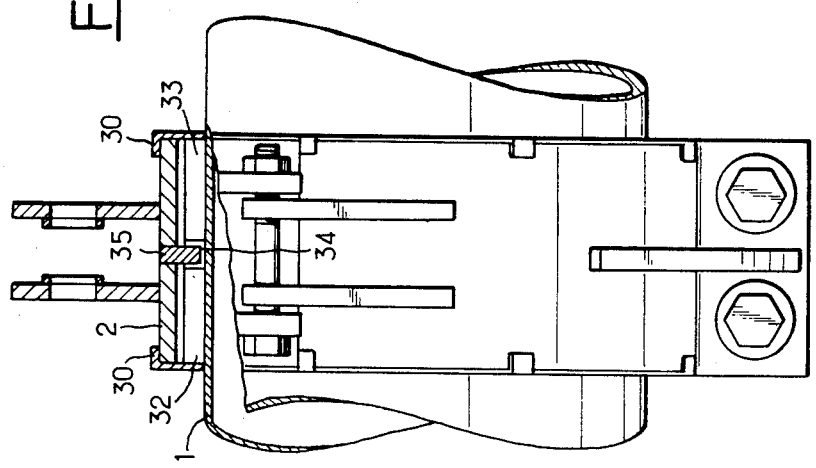
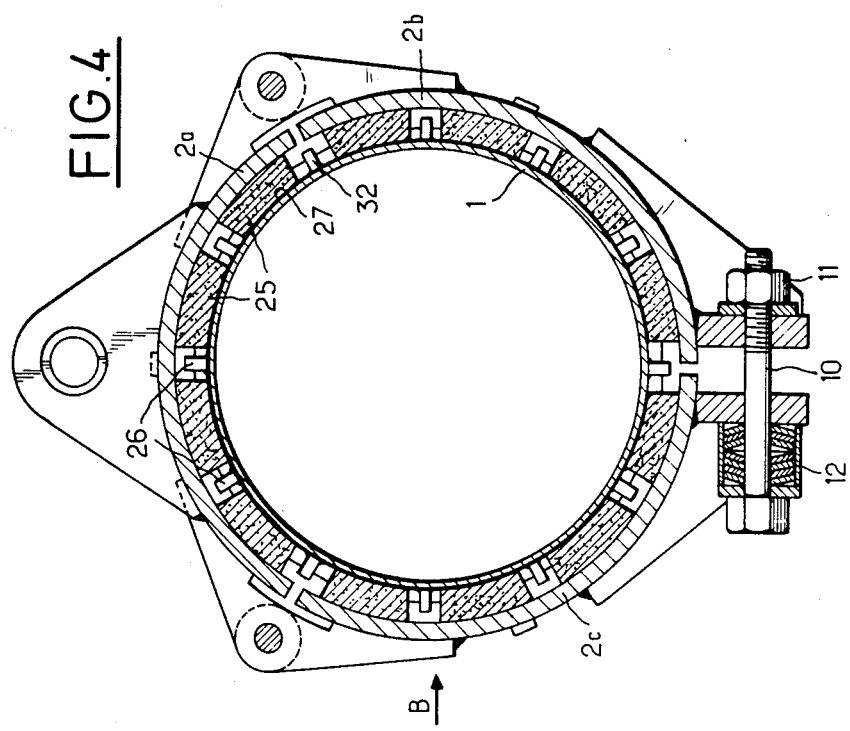

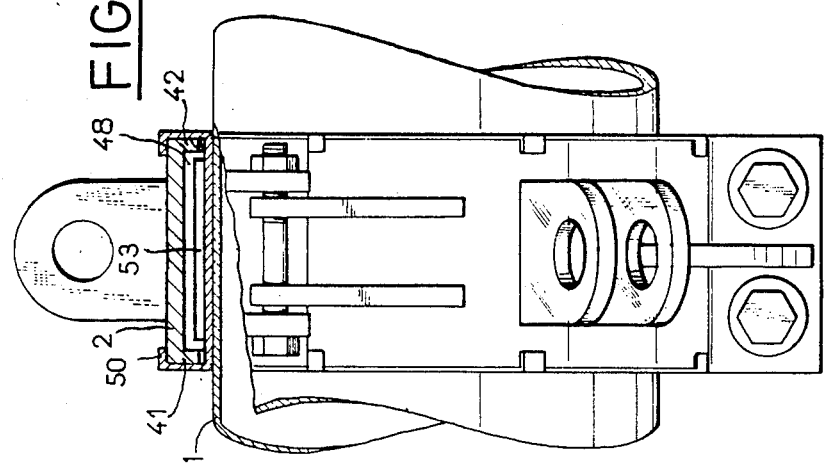
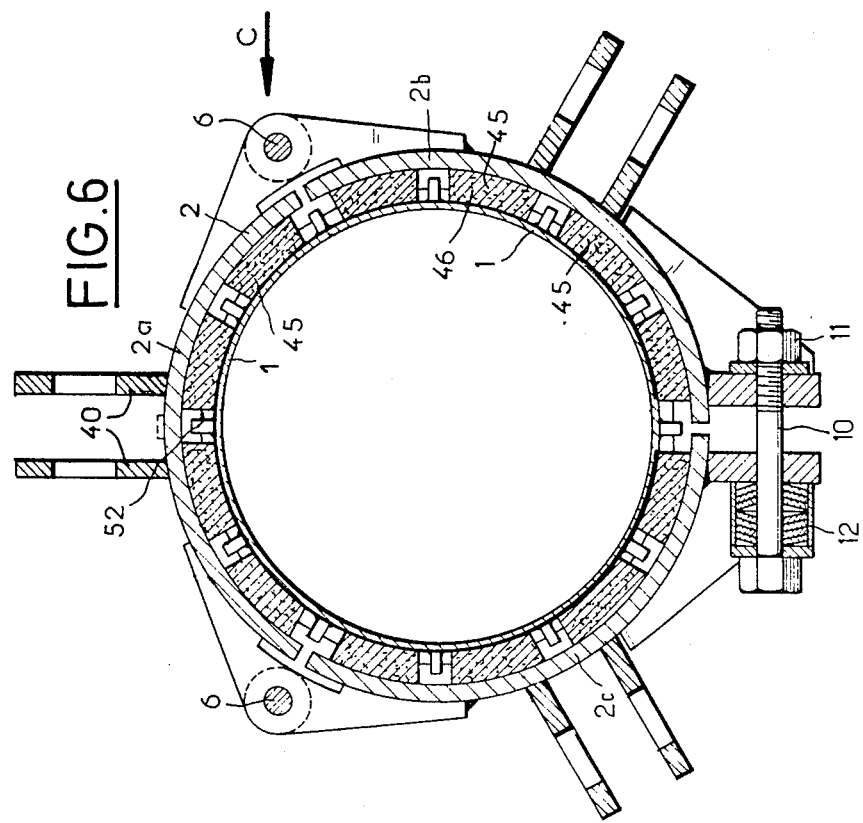

4,714,229

ANTI-VIBRATORY SUPPORT DEVICE FOR A PIPE WHOSE THICKNESS IS SMALL RELATIVE TO THE DIAMETER

FIELD OF THE INVENTION

The invention relates to an anti-vibratory support device for piping whose thickness is small relative to the diameter.

BACKGROUND OF THE INVENTION

In fast neutron nuclear reactors, the heat produced by the core of the reactor is usually conveyed to the steam generators by liquid sodium flowing in the secondary circuit of the reactor. This sodium is at elevated temperature, on the order of 500° C., and this temperature is capable of undergoing relatively large variations during the operation of the reactor. The sodium of the secondary circuit is at low pressure, on the order of a few bars, and flows in the piping of large diameter whose thickness is relatively small relative to its diameter. This piping has, for example, diameters exceeding 1 meter while its thickness is only a few millimeters and at the most 20 mm. This permits a reduction in the amount of stainless steel required to produce the secondary circuit which encloses the sodium whose super-pressure relative to atmospheric pressure is low, and a reduction in the stresses of thermal origin.

The main stresses undergone by the pipes of the secondary circuit are due to thermal shocks which may be considerable upon rapid variations in the temperature of the liquid sodium, vibrations in the secondary circuit during the operation of the reactor or even, in the case of earthquakes, cyclic forces of large amplitude.

Such pipes of large diameter and small thickness have a low resistance to crushing and may undergo large variations in diameter resulting from variations in the temperature of the sodium conveyed therein. The vibrations or other cyclic forces to which these pipes are subjected may result, in particular in the region of the anchoring points in the installation, in more or less large deteriorations in the pipe and even in the destruction of the latter.

Consequently, the supporting of such pipes in a nuclear station poses a technical problem difficult to resolve.

There has been proposed in British Patent application No. 84-01184, filed Jan. 26, 1984 filed by the assignee of the present invention, a supporting device comprising a rigid collar surrounding the pipe and defining an annular space around the latter, and elastically yieldable and deformable annular sectors interposed between the collar and the outer surface of the pipe. This device results in an effective maintenance of the pipe while it enables the latter to expand without producing high stresses in its wall. However, such a device does not permit an absorption of the vibrations or other cyclic stresses which are transmitted without attenuation by the elastically yieldable annular sectors.

SUMMARY OF THE INVENTION

An object of the invention is consequently to provide an anti-vibratory support device for a pipe whose thickness is small relative to its diameter and in respect of which the temperature is elevated in operation, said device comprising a collar surrounding the pipe in such manner as to define an annular space around the pipe and fixed on the installation in which the pipe is mounted, and an elastic and deformable element having an annular shape interposed between the collar and the pipe, said support device permitting not only effective maintenance of the pipe while enabling the latter to expand without producing excessive stresses in its wall, but also absorption of the vibrations of cyclic stresses which may be transmitted to the pipe.

For this purpose:

the collar comprises at least two rigid annular sectors disposed in the extension of each other with a gap therebetween, carrying at at least one of their ends articulation members complementary to members carried by the following sector so as to form an articulation having an axis parallel to the axis common to the pipe and the collar, at least two successive sectors being interconnected at one of their ends by an elastic junction means enabling the collar to be closed, and the annular deformable element interposed between the collar and the pipe comprises at least two successive deformable annular sectors each comprising, inside a maintaining case fixed to a sector of the collar and including an interior cylindrical bearing wall having the same diameter as the pipe, a plurality of parallelepipedic pads made from knitted stainless steel wires, interposed between the inner cylindrical surface of the collar and the outer bearing wall of the case, the elastic junction means of the collar permitting an exertion of forces of radial direction on the deformable annular sectors for subjecting them to a compression between the collar and the pipe.

BRIEF DESCRIPTION OF THE DRAWINGS

In order to explain the invention, there will now be described with reference to the accompanying drawings, several embodiments of an anti-vibratory support device according to the invention.

FIG. 1 is a cross-sectional view of a pipe and a support device according to a first embodiment of the invention.

FIG. 2 is a view in the direction of arrow A of FIG. 1.

FIG. 3 is a load diagram of the deformable elastic element of the support device shown in FIG. 1 and 2.

FIG. 4 is a cross-sectional view of a support device according to a second embodiment of the invention.

FIG. 5 is a view in the direction of arrow B of FIG. 4.

FIG. 6 is a cross-sectional view of a support device according to a third embodiment of the invention.

FIG. 7 is a view in the direction of arrow C of FIG. 6.

DETAILED DESCRIPTION

FIGS. 1 and 2 show a first embodiment of the invention in which a pipe 1 conducts liquid sodium in the secondary circuit of a fast neutron nuclear reactor. This pipe of small thickness and large diameter is fixed to the structure of the reactor by means of a collar 2 and a double suspension lug 3 welded to the collar 2.

The collar 2 comprises three rigid annular sectors 2a, 2b and 2c. These annular sectors are disposed in succession around the pipe 1 and in coaxial relation to the latter. The gaps 4 are provided between the adjacent ends of two successive sectors. The annular sector 2a carries at its two ends lugs 5a which are welded to its outer surface and are contained in a radial plane. These lugs 5a are provided with a circular opening extending axially. The sectors 2b and 2c carry at their ends disposed in confronting relation to the ends of the corresponding sector 2a, lugs 5b and 5c which are axially offset relative to the corresponding lugs 5a. The lugs 5b and 5c have openings, each opening being in axial alignment with the opening of the corresponding lug 5a so that a common shaft 6 can be engaged in the aligned openings of the two corresponding lugs and fixed in position by means of a pin 7. In this way, there is produced the articulation of the rigid sectors 2a, 2b and 2c relative to one another with an articulation axis parallel to the axis common to the pipe 1 and the collar 2.

The ends of the sectors 2b and 2c which are not connected to the sectors 2a carry welded lugs 8b and 8c respectively provided with two sets of openings aligned in a tangential direction relative to the collar 2. Two identical assemblies each formed by a screw 10, a nut 11 and a set of Belleville washers 12, enable the two lugs 8c and 8b to be interconnected and provide an elastic junction between the sectors 2b and 2c of the collar 2.

The support device also includes an annular deformable element formed by three annular sectors 14a, 14b and 14c, each disposed between the inner surface of a rigid sector of the collar 2 (2a, 2b or 2c) and the outer surface of the pipe 1.

Each of the annular sectors 14 is formed by a case of thin sheet metal 15 which is hooked at each of its longitudinal ends to the corresponding rigid sector of the collar 2 and a group of parallelepipedic pads 18 made from knitted austenitic stainless steel wires. The case 15 has a cylindrical wall 17 whose diameter is equal to the outside diameter of the pipe 1 and two annular lateral side walls 16 which are cut out along their peripheral edge so as to constitute lugs 20 for hooking the deformable sector 14 on the corresponding rigid sector of the collar 2. When the case 15 is hooked on the corresponding sector of the collar 2, the cylindrical surface 17 is coaxial with the pipe 1.

The parallelepipedic pads 18 are interposed in consecutive relation along the periphery of the pipe 1, between the inner surface of the collar 2 and the inner surface of the wall 17 of the case 15. Each of the pads 18 and the cases 15 have a length, in the axial direction of the pipe 1, which is substantially equal to the length of the collar 2.

The pads 18 are formed by an austenitic stainless steel wire having 18% chromium and 8% nickel which has been knitted and compressed so as to form an elastic but relatively compact mass. Such pads are manufactured and sold by the firm VIBRACHOC.

In order to place the support device in position on the pipe 1, after a hooking of the deformable annular sectors 14 on the corresponding rigid sectors of the collar 2 and the positioning of this collar 2 around the pipe, the assembly is clamped around the pipe by screwing the nuts 11 and screws 10. In this way, radial forces are exerted on the deformable elements 14, these radial forces being transmitted through the sectors from the collar 2 to the pads 18 and from the latter to the wall 17 of the case 15 which bears against the outer surface of the pipe 1. The pads 18 are then compressed between the collar 2 and the pipe 1.

Before the sodium arrives in the pipe 1, the latter may be brought to its operating temperature by means of electric pre-heating conductors 21 placed in the axial direction in contact with the outer surface of the pipe 1, between the successive deformable annular sectors 2a and 2b and 2a and 2c respectively.

Further, a conductor for detecting sodium 34 is placed at a low point in the gap 4.

The expansion of the pipe 1 is absorbed by the deformation of the pads 18 which are compressed between the pipe 1 and the collar 2, the radial expansion of the pipe 1 being transmitted by the cylindrical walls 17 of the case 14.

FIG. 3 shows a diagram in which the radial force exerted on the pads 18 have been plotted as ordinates and in logarithmic coordinates and in which the corresponding deformation of these pads in radial compression has been plotted as abscissae, in the case of a pipe and a support device such as those shown in FIGS. 1 and 2, the pipe having a diameter of 0.90 m and the pads 18 a thickness of 0.045 m.

In the diagram shown in FIG. 3, the radial load is given in decaNewtons and the corresponding deflection in $10^{-3}$ m. There has been shown by a thickened line on the curve showing the load as a function of the deflection of the pads, the zone of the load employed for the pipe in operation, i.e. after the clamping of the support device and the bringing of the pipe 1 to the operating temperature. This zone of load corresponds to the zone of transition of the curve at which the deflection or deformation of the pads increases little with the load. The device is then capable of effectively maintaining the pipe, a large increase in the load resulting in a small deformation of the deformable support element.

At this level of the load, the shock-absorbing capacity of the pads 18 is also very high so that the vibrations or the cyclic stresses of large amplitude which could be transmitted between the installation and the pipe are in large part absorbed by the deformable elements interposed between the collar 2 and the pipe 1. This absorption of energy is produced by the friction of the stainless steel wire on itself in the compressed knitted structure. The coefficient of friction of the austenitic stainless steel on itself is indeed high and the absorption of energy of these levels of stress is itself very high.

The stresses transmitted to the wall of the pipe 1 during the operation of the nuclear reactor, either under the effect of vibrations, external stresses such as those accompanying an earthquake, or expansions upon variations in the temperature of the conducted sodium, remain within acceptable limits, the deformable pads 18 absorbing the axial compression in the zone of load without increasing the radial load excessively while damping very effectively the cyclic forces by friction.

FIGS. 4 and 5 show a second embodiment of the support device according to the invention, the correpsonding elements in FIGS. 4 and 5 and in FIGS. 1 and 2 carrying the same reference characters.

In this embodiment, four deformable annular sectors 25 are disposed in consecutive relation with gaps 26 therebetween, under each of the rigid sectors 2a, 2b and 2c of the collar 2. Each of these annular sectors 25 has a cylindrical wall 27 whose diameter is the same as the diameter of the pipe 1 which bears against the latter when the collar 2 is clamped by means of the elastic junction 10, 11, 12. These annular sections 25 are hooked, as explained before, by inwardly-bent lugs 30, to corresponding sectors of the collar 2.

Disposed in each of the gaps 26 between two successive annular sectors 25, are two strips 32 and 33 welded to the outer surface of the pipe 1 and extending in the axial direction. Formed between the strips 32 and 33 is a space 34 in which is disposed a pin 35 introduced through an opening extending through the collar 2 throughout its thickness. A similar arrangement for the twelve strip assemblies 32 and 33 enables the support device to be fixed axially relative to the pipe 1. In this way, any displacement of the pipe by sliding inside its support device is avoided.

Such an axial locking device is particularly desirable for a vertically extending pipe 1.

Such a vertically extending pipe has been shown in FIGS. 6 and 7 which illustrate a third embodiment of the device. The elements corresponding to those described with reference to FIGS. 1 and 2 and 4 and 5 carry the same reference characters in FIGS. 6 and 7.

The vertical pipe 1 is disposed inside a collar 2 the three sectors 2a, 2b and 2c of which carry an assembly of two fixing lugs 40. The rigid sectors 2b and 2c of the collar 2 are, as before, articulated about axially extending axes 6 on the sector 2a and are connected at their other ends by an elastic junction assembly 10, 11, 12 which enables the deformable annular sectors 45 to be compressed between the collar 2 and the pipe 1.

As can be seen in FIG. 7, the rigid sectors of the collar 2 have two lateral flanges 41 and 42 of annular shape throughout their length. The rigid sectors of the collar 2 having lateral flanges 41 and 42 thus define an annular space 48 between their inner surface and the outer surface of the pipe 1. The ends of the flanges 41 and 42 define a clearance between their end and the outer surface of the pipe 1, so that the annular space 48 is not entirely closed.

Disposed inside the space 48 are the deformable annular sectors 45 which include, as before, a case 46 hooked at its ends to the collar 2 by inwardly-bent lugs 50. Juxtaposed inside each of the cases 46 are parallelepipedic pads made from knitted stainless steel wires.

Disposed under each of the rigid sectors 2a, 2b, 2c of the collar 2 are four deformable annular sectors 45 which are separated by gaps 52. Fixed inside each of the gaps 52 in the axial direction of the space 48 is a strip 53 welded to the outer surface of the pipe 1. The strip 53 has a length which is a little less than the dimension in the axial direction of the annular space 48. In this way, the support device is axially maintained relative to the pipe by flanges 41 and 42 of the sectors of the collar 2 placed on each side of the ends of the strip 53.

This arrangement is of particular utility in the case of a pipe having a vertical axis as shown in FIG. 7.

It can be seen that the main advantages of the device according to the invention are to permit an effective fixing of the pipe while allowing radial expansions of the latter. Further, the support device according to the invention permits an absorption of the vibrations or other cyclic forces to which the pipe is subjected during the operation of the reactor or in the event of an earthquake.

In particular embodiments, the pipe may be fixed axially relative to its support.

The scope of the invention is not intended to be limited to the embodiments which have been described and it encompasses all modifications.

Thus, the number of deformable annular sectors may be different from that described in the embodiments.

An elastic junction structure may also be imagined for the rigid sectors of the collar which is different from that described.

The collar may also be used for fixing or suspending the pipe relative to the structures of the reactor in a manner different from those described.

The hooking of the cases of the annular sectors on the collar may be achieved in a way different from that described, in which this hooking was ensured by a simple forming over of the flanges of the lateral walls of the case.

The support device according to the invention may be used not only in the case of pipes of the secondary circuit of a fast neutron nuclear reactor, but also in all cases where it is desired to achieve an anti-vibratory supporting of a pipe which has a large diameter and a thin wall for conveying a fluid at high temperature.

What is claimed is:

1. An anti-vibratory support device for a pipe whose thickness is small relative to its diameter and whose operating temperature is elevated, said device comprising a collar for fixing to an installation in which the pipe is to be mounted and surrounding the pipe in such manner as to define an annular space around the pipe, and a deformable and elastic annular means interposed between the collar and the pipe, said collar comprising at least two rigid annular sectors disposed in the extension of one another in spaced relation so as to define a gap therebetween, each rigid sector carrying at at least one of its ends, articulation means substantially complementary to articulation means carried by the succeeding rigid sector, so as to constitute an articulation having an articulation axis parallel to an axis common to the pipe and the collar, an elastic junction means interconnecting at least two successive rigid sectors at one end of the rigid sectors and enabling the collar to be closed, and the deformable annular means interposed between the collar and the pipe comprising at least two successive deformable annular sector structures, each sector structure comprising a maintaining case fixed to a rigid sector of the collar and having a cylindrical inner bearing wall having the same diameter as the pipe, and a plurality of parallelepipedic pads made from knitted stainless steel wire disposed in said case and interposed between an inner cylindrical surface of the collar and said inner bearing wall of the case, said elastic junction means of the collar permitting the exertion of forces of radial direction on the deformable annular sector structures so as to put them under compression between the collar and the pipe.

2. A support device according to claim 1, wherein said deformable annular sector structures are disposed in successive relation around the pipe and define therebetween gaps inside each of which gaps are fixed by welding on an outer surface of the pipe, two successive strips which extend axially of the pipe and define a space, a pin inserted in a throughway opening in the collar having an end portion which extends into said space between said successive strips, said strips and pins maintaining the pipe axially relative to its support device.

3. A support device according to claim 1, wherein said rigid sectors of the collar have lateral flanges which laterally limit the annular space formed between an inner surface of the collar and the outer surface of the pipe, the deformable annular sector structures being disposed in successive relation in said annular space and defining therebetween gaps in each of which gaps is fixed by welding to the pipe a strip extending axially of the pipe, said strip having a length a little less than the dimension of said annular space axially of the pipe and cooperating with said flanges of the rigid sectors of the collar so as to axially maintain the pipe relative to its support device.

4. A support device according to claim 1, wherein at least one of the rigid sectors of the collar carries a lug for mounting the pipe relative to the installation in which it is to be mounted.

5. A support device according to claim 2, wherein at least one of the rigid sectors of the collar carries a lug for mounting the pipe relative to the installation in which it is to be mounted.

6. A support device according to claim 3, wherein at least one of the rigid sectors of the collar carries a lug for mounting the pipe relative to the installation in which it is to be mounted.

7. A support device according to claim 1, wherein the collar comprises three rigid sectors.

* * * * *